UNITED STATES PATENT OFFICE.

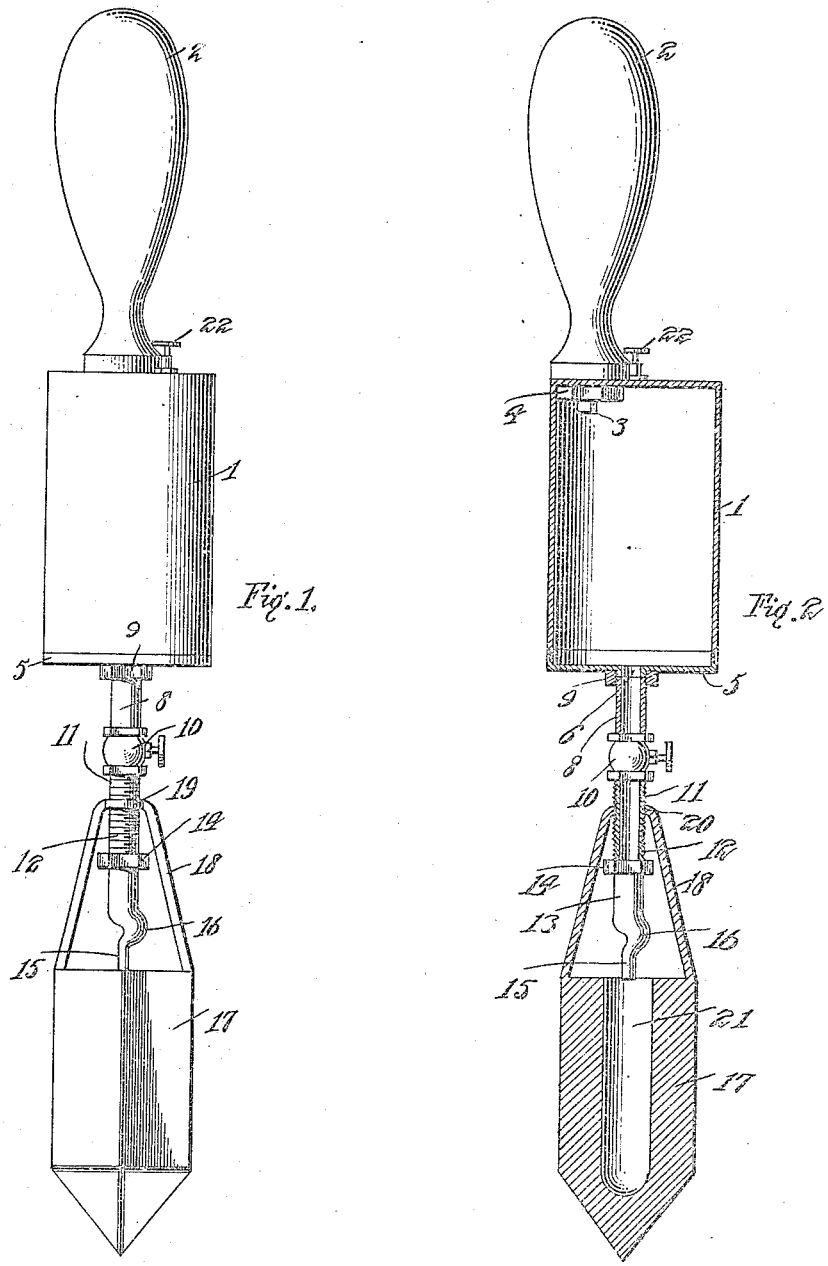

WILLIAM E. CORKERY, OF WADENA, IOWA.

SOLDERING-TOOL.

1,253,215.  Specification of Letters Patent.  Patented Jan. 15, 1918.

Application filed September 26, 1916. Serial No. 122,279.

*To all whom it may concern:*

Be it known that I, WILLIAM E. CORKERY, a citizen of the United States, residing at Wadena, in the county of Fayette and State of Iowa, have invented certain new and useful Improvements in Soldering-Tools, of which the following is a specification.

This invention is a soldering tool and has special reference to that class of like devices which are self-heating.

One object of this invention is the production of a soldering tool wherein a plurality of conduits are provided wherein the liquid fuel is partly vaporized before being discharged from the nozzle.

Another object of this invention is the production of a soldering tool wherein one of the conduits has external threads thereby allowing the frame of the soldering arm to be adjustably mounted thereon for allowing the iron to be turned to an adjusted position by the movement of the frame along the externally threaded conduit, thus allowing the soldering arm to be moved with respect to the nozzle for causing a proper burning of the semi-vaporized fuel being injected into the interior of the soldering iron.

The invention is clearly illustrated in the accompanying drawings, wherein:—

Figure 1 is a side elevation of my improved soldering tool, and

Fig. 2 is a vertical section therethrough.

Similar characters of reference are employed in all of the above described views, to indicate corresponding parts.

Referring now more specifically to the several figures of the said drawings, my improved device comprises a tank 1, the same serving as the body portion of the tool and has engaged with the upper portion thereof, a suitable handle member 2, the lower portion of which carries thereupon a dependent shank 3, preferably screw threaded, whereby a locking nut 4 may be turned into engagement therewith. Thus, it is evident that when the top wall of the tank 1 is engaged by the shank 3 and the locking nut 4 turned into engagement with the said shank to a position adjacent the inner surface of the wall, these two elements will be held in rigid relation. A removable bottom 5, having a screw threaded upright flange is engaged with a complementary threaded portion formed upon the lower marginal edges of the tank 1 and has formed therein a concentrically arranged opening surrounded by an externally threaded sleeve 6. A conduit 8, having the opposite extremities thereof screw threaded, is engaged with the threaded sleeve 6, and held in fixed relation thereto by means of a locking nut 9, it being noted that the said nut spans the point of jointure between the sleeve 6 and the conduit engaging the screw threaded portions of each. A suitable controlling valve 10, is engaged with the remaining threaded extremity of the conduit 8 and has turned into engagement with the opposite end of its casing, a second conduit 11. As is obvious, the conduit 11 has arranged upon the peripheral surface thereof screw threads indicated by the numeral 12. A nozzle support 13 is connected with a free end of the conduit 12 by means of the union as afforded by the nut 14, the lower portion of the same being reduced as at 15 in order that the liquid fuel will be ejected therefrom in a semi-vaporized and extremely fine spray. With a view toward providing for an efficient generator, whereby the liquid fuel as used in conjunction with the tool may be converted into a highly combustible charge, a portion of the support, adjacent the reduced portion thereof, is offset as shown at 16. Consequently, as the fuel is conveyed from the tank 1 downwardly through the conduits 8 and 11 it will be partly vaporized, while the offset portion 16 will increase the vaporizing action. Furthermore the tortuous path assumed by the fuel will delay the discharge thereof from the reduced end or nozzle 15, whereupon the heat as radiated from the heating flame will complete the vaporizing operation and afford a continuous and even blue heating flame.

A soldering iron 17, of conventional formation, is provided and has formed upon the rear extremity thereof a laterally extending U-shaped connecting frame 18, the outermost portion of which is enlarged at 19 and has formed therein an interiorly threaded opening 20. Thus, when the internally threaded opening 20 of the frame 18 is engaged with the externally threaded conduit 11, adjustment of the iron 17 with relation to the nozzle 15 may be varied, as conditions or preference may dictate. A longitudinal pocket 21 is formed centrally of the iron 17, and receives therein the heating flame from the nozzle, thereby permitting the same to be heated.

In order to provide a vent for the tank 1, a suitable valve 22 of any desired construction is attached to the tank. By providing the valve the passage of air into the tank 1 may be minutely regulated by the user of the tool, thereby preventing a vacuum within the tank as the liquid fuel is used therefrom.

The operation of the invention may be reviewed as follows:

The tank 1 is filled with the necessary liquid fuel, whereupon the valve 10 is opened to permit the flow of the fuel from the conduit 8 into the conduit 11, thence through the nozzle support 13 into the offset portion 16 thereof and is then discharged from the reduced portion or nozzle 15. At this point, the fuel is ignited and the soldering iron 17 adjusted upon the conduit 11, through the medium of the frame 18, until the proper supply of air is had, whereupon, a continuous blue flame of intense heat will be given. When the iron 17 has been sufficiently heated, it may be then engaged with the article to be soldered. To refill the tank 1, the bottom 5 is removed, although after the tank has been refilled the bottom 5 is then screwed onto the tank.

I am aware that changes may be made in the arrangement and combination of parts as well as in the details of the construction illustrated and described, without departing from the scope of my invention, as claimed. Hence, I do not limit my invention to the exact arrangement and combination of the devices and parts as illustrated in the accompanying drawings, and as described in the accompanying specification.

I claim:—

1. A soldering iron, the combination of an externally threaded conduit, means for supplying said conduit with fuel, a burner support bearing upon said conduit, a nut connecting said burner support to said conduit, a reduced offset portion extending from said support, a nozzle extending from said off-set portion and projecting in the same direction as said support, a soldering iron having an internal pocket, an inverted frame having converging side portions provided with a thickened end portion, said thickened portion being internally threaded and fitting upon said conduit, whereby said iron may be turned so as to move said thickened portion along said conduit for adjusting said iron very easily and quickly, thus causing the iron to be adjusted with respect to the end of said nozzle for maintaining a proper air space for combustion of the fuel.

2. In a soldering iron, the combination of an externally threaded conduit, means for supplying said conduit with fuel, a burner support bearing upon said conduit, means for connecting said burner support to said conduit, a reduced off-set portion extending from said support, a nozzle extending from said off-set portion and projecting in the same direction as said support, a hollow soldering iron carried adjacent the end of said nozzle, thus causing an off-set portion to be heated to a high degree for assisting in vaporizing the fuel which passes from said nozzle into said soldering iron.

In testimony whereof I affix my signature in presence of two witnesses.

WILLIAM E. CORKERY.

Witnesses:
R. KNUTSON,
A. G. HERRLING.

Copies of this patent may be obtained for five cents each, by addressing the "Commissioner of Patents, Washington, D. C."